No. 894,665. PATENTED JULY 28, 1908.
J. B. KISSNER.
FOLDING FIELD GLASSES.
APPLICATION FILED SEPT. 20, 1907.
3 SHEETS—SHEET 2.
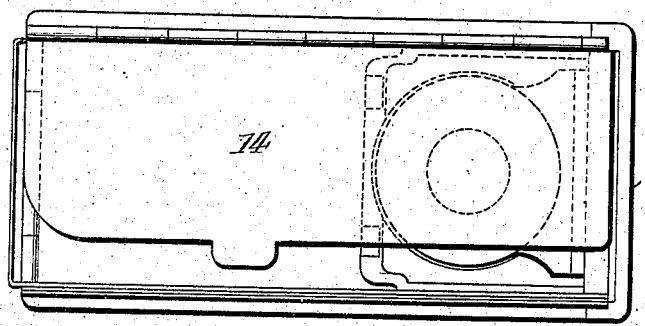
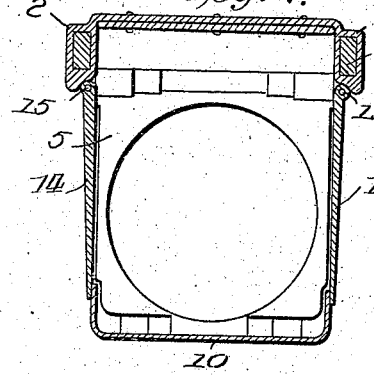 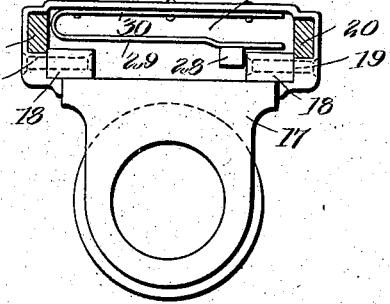
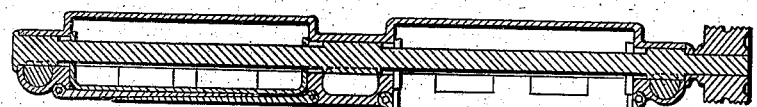
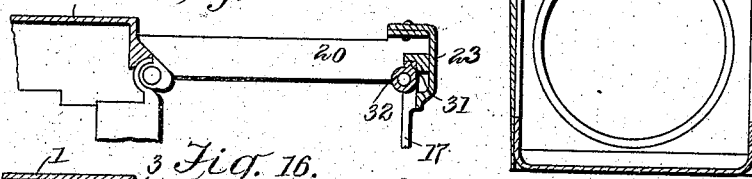
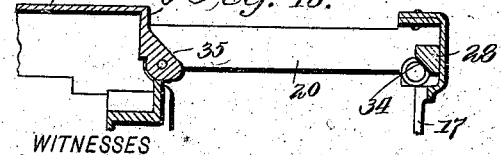
WITNESSES
Samuel E. Wade
C. E. Trainor
INVENTOR
JOHN B. KISSNER
BY Munn & Co.
ATTORNEYS.

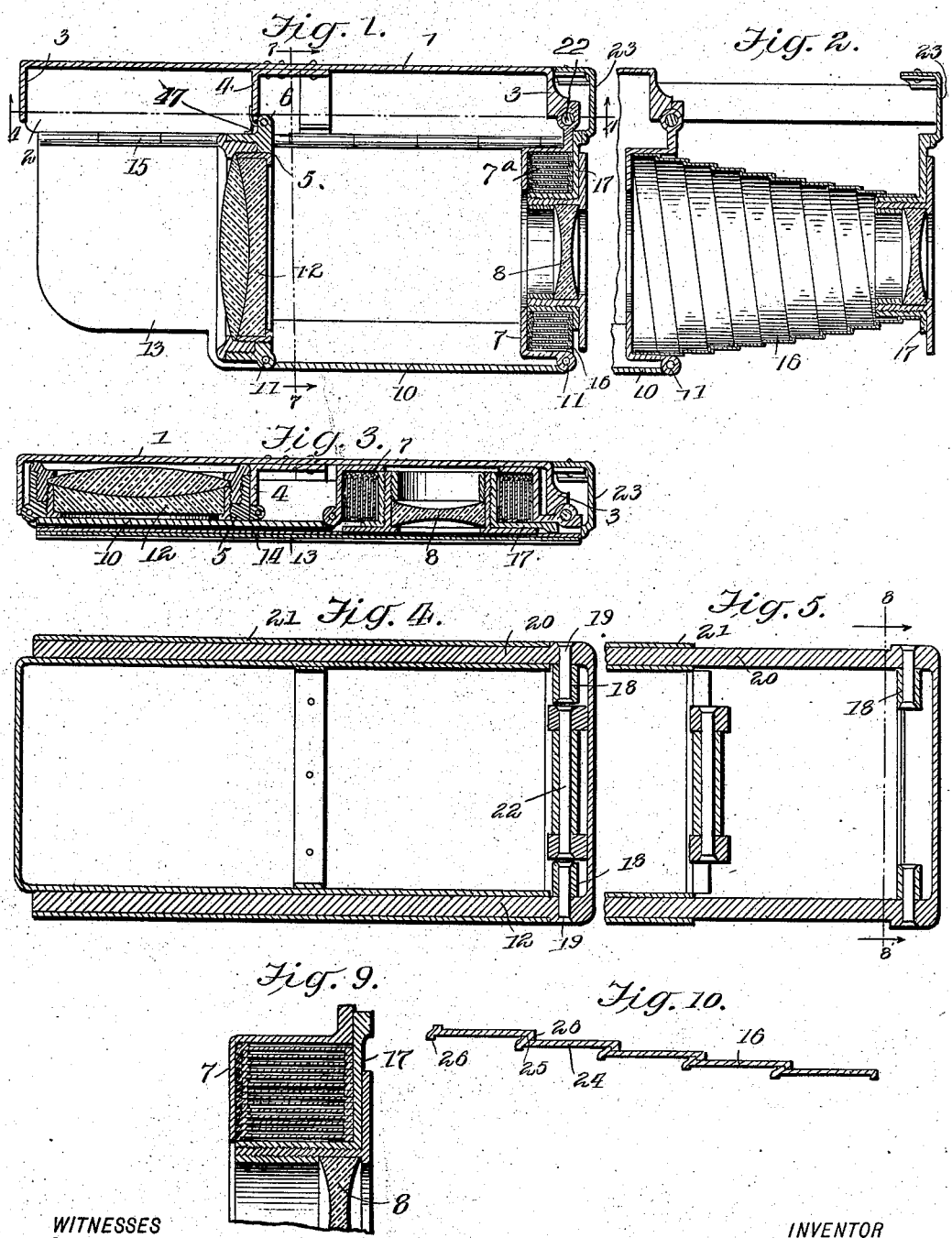

No. 894,665. PATENTED JULY 28, 1908.
J. B. KISSNER.
FOLDING FIELD GLASSES.
APPLICATION FILED SEPT. 20, 1907.
3 SHEETS—SHEET 3.
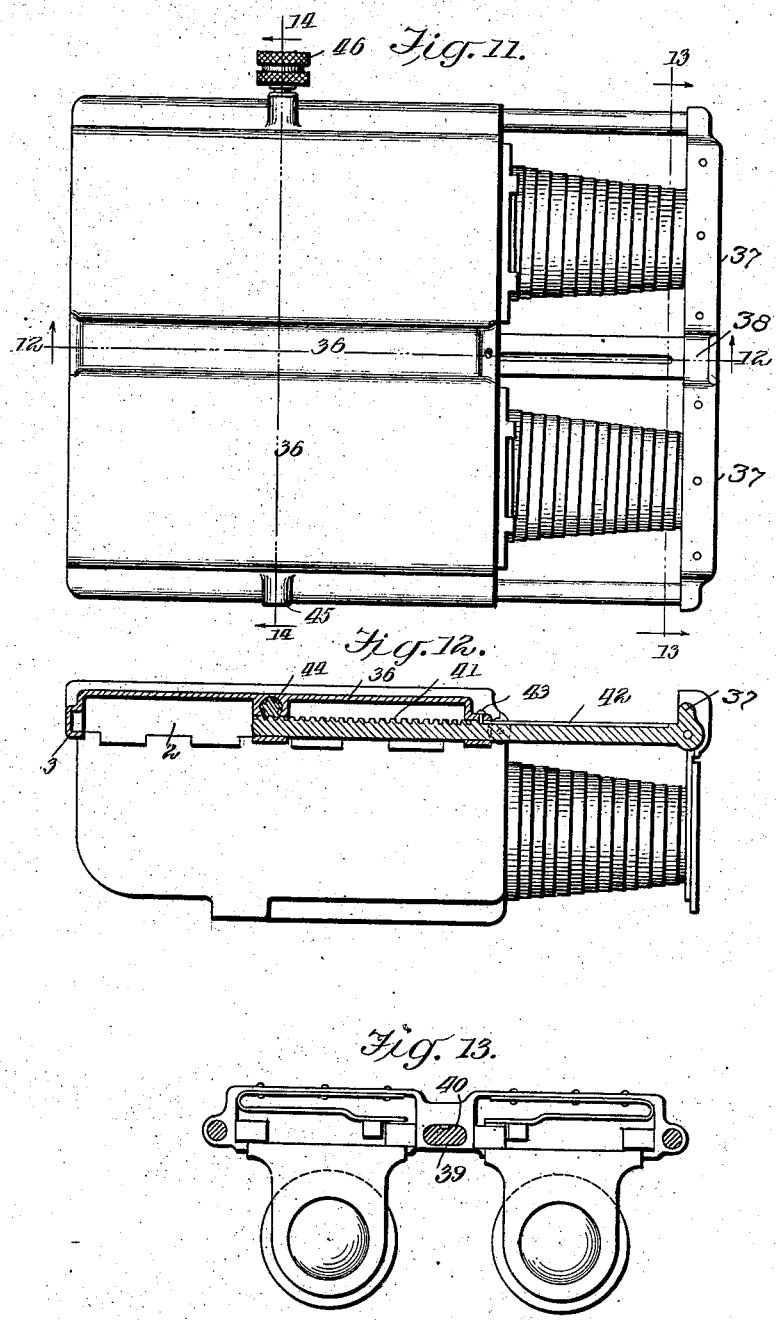
WITNESSES
Samuel E. Wade
C. E. Tranor
INVENTOR
JOHN B. KISSNER
BY Munn & Co.
ATTORNEYS

UNITED STATES PATENT OFFICE.

JOHN B. KISSNER, OF BALTIMORE, MARYLAND.

FOLDING FIELD-GLASSES.

No. 894,665.　　　　　Specification of Letters Patent.　　　　Patented July 28, 1908.

Application filed September 20, 1907. Serial No. 393,800.

*To all whom it may concern:*

Be it known that I, JOHN B. KISSNER, a citizen of the United States, and a resident of Baltimore, in the State of Maryland, have invented certain new and useful Improvements in Folding Field-Glasses, of which the following is a specification.

My invention is an improvement in folding field glasses and consists in certain novel constructions and combinations of parts hereinafter described and claimed.

Referring to the drawings forming a part hereof, Figure 1 is a central longitudinal section through the unfolded glass showing the bellows contracted. Fig. 2 is a portion of Fig. 1 showing the bellows extended. Fig. 3 is a central longitudinal section through the folded glass. Fig. 4 is a section on the line 4—4 of Fig. 1 looking in the direction of the arrows, with the bellows contracted. Fig. 5 is a portion of Fig. 4 with the bellows extended. Fig. 6 is a plan view of the glass partially folded. Fig. 7 is a transverse section of the unfolded glass on the line 7—7 of Fig. 1. Fig. 8 is a similar section on the line 8—8 of Fig. 5, looking in the direction of the arrow. Fig. 9 is an enlarged detail of a portion of Fig. 1, with the bellows contracted. Fig. 10 is a detail of a portion of the bellows extended. Fig. 11 is a plan view of a binocular glass with the bellows extended. Fig. 12 is a section on the line 12—12 of Fig. 11. Fig. 13 is a section on the line 13—13 of Fig. 11, looking in the direction of the arrow. Fig. 14 is a section on the line 14—14 of Fig. 11 with one of the tubes folded and the other unfolded. Figs. 15 and 16 are detail sectional views of one end of the glass showing the construction of the catch.

The present embodiment of my invention comprises a back or base 1 having end and side flanges 2, 3, and an approximately central transverse flange 4. A substantially square frame 5 for containing the objective 12 is hinged to the central flange 4 as at 6, and another frame 7 for receiving the eye-piece 8, is hinged to the end flange 3 as at 9, and the two frames 5 and 7 are connected at their free ends by a plate 10, the said plate being hinged to both frames as at 11. Sides 13 and 14 are hinged to the side flanges 2 of the back, as at 15, the said sides being adapted to fold one upon the other, after the frames 5 and 7 are folded into the back as shown in Fig. 6, whereby to inclose the said eye-piece and objective in a flat case as shown in Fig. 3.

The objective 12 is mounted in the frame 5 in the ordinary manner, but the eye-piece 8 is connected to the frame 7 by a bellows 16, to be presently described, one end of the bellows being connected with the frame, and the other with the eye-piece support 17.

The eye-piece support 17, comprises a frame of the shape shown in Fig. 8, the upper edge of the frame being provided at its ends with bearings 18, for engaging pivot pins 19, connected with sliding bars 20, arranged to move in guideways 21 formed in the side flanges 2 of the back or base, as shown in Fig. 4, and the bearings 18 of the support 17, are so arranged that the pivot pin 22 connecting the frame 7 with the end flange 3 of the back will fit in between the said bearings, when the sliding bars are moved to bring the eye-piece support in closed position as shown in Fig. 4. When in such closed position, the eye-piece support fits within the frame 7, which is cup-shaped to form a depression as shown at 7ª for this purpose, and the frame 7 and the support 17 containing the eye-piece fold as a whole into the back. The outer ends of the sliding bars 20 are connected by a cross-piece 23, and the eye-piece support 17 is hinged to the sliding bars 20 near their outer ends, being limited in its outward swing by contact with the lower edge 23ª of the cross-piece 23, said edge forming a stop.

The bellows 16 may be of ordinary form, or they may be of the construction shown in Figs. 9 and 10, comprising a strip arranged spirally, the spirals 24 overlapping as at 25, the strip being provided with flanges 26 at each edge as shown in Fig. 10, so arranged that when the spiral is extended the flanges will engage, thus forming stops for limiting the extending movement of the spiral. As before stated one end of the bellows is connected with the frame 7 and the other with the eye-piece support 17, so that when the eye-piece support is moved away from the frame 7 the bellows will be extended.

A spring stop or latch is provided for locking the eye-piece support in open position, the stop comprising a block 28 mounted on the end of a plate spring 29 secured as at 30 to the cross-piece 23 connecting the bars 20, the said stop being provided with a notch 31, for engagement by a lug 32 on the eye-piece support 17, when the said support is swung into the open position. The block 28 is provided with a beveled surface 34, for engagement by a bevel surface 35, on the end flange 3 of the back, the said beveled surfaces being so arranged with respect to each other, that when the sliding bars are moved inwardly, the block will be lifted out of locking position to permit the folding of the support 17 and the frame 7.

The above described mechanism is adapted for monocular field glasses and in Figs. 11 to 14, is shown the construction made use of in binocular glasses. This construction comprises a back 36, consisting of two connected portions, each of which is similar to the back 1 before described, being provided with side and end flanges arranged in the same manner as in the monocular construction. There is also cross-piece 37 consisting of two portions each similar to the cross-piece 23, in other figures of my drawings, to which cross-piece 37 the eye-piece supports 17, 17, are attached. The mounting of the swinging frames 5 and 7 and the swinging supports 17 is also the same.

The connecting portion 38 of the two sections of the back, is provided with a guideway 39, in which moves a sliding bar 40, provided on its upper face with rack teeth 41, for a purpose to be presently described, and with a central longitudinal groove 42, engaged by a set screw 43 threaded through the connecting portion 39. The sliding bar 40 is joined to the portion 37 connecting the eye-piece supports, and the teeth are engaged by a pinion 44 mounted on a rod 45 journaled transversely of the back, and provided on its outer end with a milled head 46, for convenience in manipulating the pinion.

In the above described construction, each of the sides of the separate barrels or tubes of the field glass folds separately, but the swinging frames and supports fold together. As shown in Fig. 1 a spiral spring 47 is arranged around the pivot pin of the folding frame 5, one end of the spring engaging the flange 4, and the other engaging the frame 5, the said spring acting normally to swing the connected frames outwardly from the back. It will be observed that the back is provided with recesses for receiving the swinging frames and that when folded the glass occupies but little space.

I claim—

1. A folding field glass, comprising a back having side and end flanges and a transverse flange intermediate the end flanges, foldable sides hinged to the side flanges, an objective supporting frame hinged to the transverse flange, a frame hinged to one of the end flanges and provided with a cup-shaped depression having an opening at the center thereof, a plate hinged to the free ends of the frames and adapted to form with the sides a tube when said frames are unfolded, said back being provided with longitudinal guideways at the sides thereof, bars slidable in the guideways, a cross-piece connecting the free ends of the bars, an eye-piece supporting frame provided on one side with bearings at the corners, pivot pins connected with the bars and upon which the bearings are journaled, a bellows having one end secured in the cup-shaped depression and the other to the eye-piece supporting frame, said cup-shaped depression being adapted to receive therewithin the eye-piece and the bellows when the sliding bars are in their inward position, a spring acting normally to move the swinging frames away from the back, stops for limiting the outward movement of said frames, and a latch for locking the eye-piece support in its outermost position, said latch comprising a plate spring connected by one end to the cross-piece, and having at its other end a block, said eye-piece supporting frame being provided with a lug behind which the block engages when said frame is moved outwardly, said back and said block being each provided with coöperating cam surfaces whereby to lift said block when the sliding bars are moved to their inward position.

2. A folding field glass, comprising a back having side and end flanges and a transverse flange intermediate the end flanges, foldable sides hinged to the side flanges, an objective supporting frame hinged to the transverse flange, a frame hinged to one of the end flanges and provided with a cup-shaped depression having an opening at the center thereof, a plate hinged to the free ends of the frames and adapted to form with the sides a tube when said frames are unfolded, said back being provided with longitudinal guideways at the sides thereof, bars slidable in the guideways, a cross-piece connecting the free ends of the bars, an eye-piece supporting frame provided on one side with bearings at the corners, pivot pins connected with the bars and upon which the bearings are journaled, a bellows having one end secured in the cup-shaped depression and the other to the eye-piece supporting frame, said cup-shaped depression being adapted to receive therewithin the eye-piece and the bellows when the sliding bars are in their inward position, a spring acting normally to move the swinging frames away from the back, stops for limiting the outward movement of said frames, and a latch for locking the eye-piece support in its outermost position.

3. A folding field glass comprising a back, an objective supporting frame hinged to the back intermediate its ends and adapted to fold thereagainst, a second frame provided with a cup-shaped depression having an opening at the center thereof, and with a hinge at the center of one side connecting the frame with one end of the back, a plate hinged to the free ends of each of the frames, sides hinged to the sides of the back and foldable over the frames, said sides and plates forming a tube when unfolded, an eye-piece supporting frame adapted to be received in the cup-shaped depression and connected with the sides of the depression by an extensible tube, said back being provided with longitudinal guideways at the sides thereof, bars slidable in the guideways, a cross-piece connecting the free ends of the bars, and to which the eye-piece supporting frame is hinged, a spring acting normally to move the swinging frames away from the back, stops for limiting the outward movement of said frames, and a latch for locking the eye-piece supports in their outermost position.

4. A folding field glass comprising a back, an objective supporting frame hinged to the back intermediate its ends and adapted to fold thereagainst, said back being provided with longitudinal guideways at the sides thereof, bars slidable in the guideways, a cross-piece connecting the free ends of the bars, an eye-piece supporting frame hinged to the cross-piece, a frame hinged to the end of the back at the end adjacent to the eye-piece supporting frame, said frame being provided with a central depression having an opening at the center thereof, an extensible tube connecting the walls of the depression with the eye-piece supporting frame, a plate hinged to the free ends of the objective supporting frame and the intermediate frame, means for locking the eye-piece in its outermost position, means in connection with the locking means and the back for releasing said lock when the sliding bars are moved to their innermost position, sides hinged to the sides of the back and adapted to fold over the frames when said frames are folded, and adapted to form with the plate a tube when unfolded.

5. A folding field glass comprising a back, an objective supporting frame hinged to the back intermediate its ends, a second frame hinged to the frame and provided with a depression and an opening at the center of the depression, a plate hinged to the free ends of each of the frames, sides hinged to the side edges of the back and foldable over the frames, said sides and plate forming a tube when unfolded, an eye-piece supporting frame, an extensible tube connecting the frame with the walls of the depression, means for moving said eye-piece supporting frame towards and from the second frame, said depression being adapted to receive the extensible tube when said frames are moved together, means for locking the eye-piece supporting frame in its extended position, and means for releasing said lock when said frame is moved into contact with the second frame.

6. A folding field glass comprising a back, an objective supporting frame hinged to the back intermediate its ends, a second frame hinged to one of the ends of the back, a plate hinged to the free ends of each of the frames, sides hinged to the side edges of the back and foldable over the frames, said sides and back forming a tube when unfolded, bars slidably mounted in the back, an eye-piece supporting frame connected to the outer ends of the bars, an extensible tube connecting the eye-piece supporting frame with the second frame, means for permitting said eye-piece supporting frame to swing with the second frame when moved thereagainst, a spring normally acting to open said frames, and a latch for retaining the eye-piece support in open position, said latch comprising a plate spring having at one end a block, said eye-piece supporting frame being provided with a lug behind which the block engages when said frame is moved outwardly, said back and said block being each provided with coöperating cam surfaces whereby to lift the block when the sliding bars are moved to their inward position.

7. A folding field glass comprising a back, an objective supporting frame hinged to the back intermediate its ends, a second frame hinged to one of the ends of the back, a plate hinged to the free ends of each of the frames, sides hinged to the sides of the back and foldable over the frames, said sides and back forming a tube when unfolded, bars slidably mounted in the back, an eye-piece supporting frame connected to the outer ends of the bars, an extensible tube connecting the eye-piece supporting frame with the second frame, means for permitting said eye-piece supporting frame to swing with the second frame when moved thereagainst, a spring normally acting to open said frames, and a latch for retaining the eye-piece support in open position.

8. A folding field glass comprising a back, an objective supporting frame hinged to the back intermediate its ends, a second frame hinged to one of the ends of the back, a plate hinged to the free ends of each of the frames, sides hinged to the sides of the back and foldable over the frames, said sides and back forming a tube when unfolded, bars slidably mounted in the back, an eye-piece supporting frame connected to the outer ends of the bars, an extensible tube connecting the eye-piece supporting frame with the second frame, means for permitting said eye-piece supporting frame to swing with the second frame when moved thereagainst, and a spring normally acting to open said frames.

9. A folding field glass comprising a back, an objective supporting frame hinged to the back intermediate its ends, a second frame hinged to one of the ends of the back, a plate hinged to the free ends of each of the frames, sides hinged to the sides of the back and foldable over the frames, said sides and plates forming a tube when unfolded, bars slidably mounted in the back, an eye-piece supporting frame connected to the outer ends of the bars, and an extensible tube connecting the eye-piece supporting frame with the second frame, said eye-piece supporting frame swinging with the second frame when moved thereagainst.

10. A folding field glass comprising a back, a pair of frames hinged transversely of the back and spaced apart from each other, one of said frames being adapted to support the objective, a plate hinged to the free ends of the frames, sides hinged to the sides of the back and foldable over the frames, said sides and plate forming a tube when unfolded, an eye-piece supporting frame movable toward and from the other frame and adapted to swing therewith when in contact with said frame, an extensible tube connecting said frame with the eye-piece supporting frame, means for locking the eye-piece supporting frame in its extended position, and means for releasing said lock when said frame is moved into contact with said frame.

11. A folding field glass comprising a back, foldable tubes in connection with the back, said tubes being formed of sides hinged to the back, and folding frames hinged transversely of the back, the free ends of the frames being connected by a plate, one of said frames being adapted to support the objective, and the other to receive the eye-piece, an eye-piece supporting frame movable toward and from the eye-piece receiving frame, an extensible tube connecting said receiving frame with the supporting frame, means for locking the eye-piece supporting frame in its extended position, and means for releasing said locking means when said frame is moved into contact with the receiving frame.

12. A folding field glass comprising a back, an objective supporting frame and an eye-piece supporting frame in connection with the back and foldable thereon, said back being provided with recesses for receiving said frames, means foldable on the back for forming a tube inclosing said frames when unfolded, means for moving the eye-piece supporting frame toward and from the objective supporting frame whereby to extend and contract the tube, and means for locking the frames in open position.

13. In folding field glasses, a back, sides hinged to the sides of the back, an objective supporting frame and an eye-piece receiving frame hinged transversely of the back and spaced apart from each other, an eye-piece supporting frame slidably connected with the back and movable toward and from the eye-piece supporting frame, and adapted to fold therewith, and a bellows connecting the receiving frame with the supporting frame, said bellows comprising a strip of resilient material arranged in spiral form, said strip being provided on one edge with an internal flange, and on the other edge with an external flange, one end of the strip being connected with the supporting frame and the other with the receiving frame.

JOHN B. KISSNER.

Witnesses:
JOHN A. BOYD,
ANN CATH KISSNER